W. T. HOOKEY.
PACKAGING BRICKS FOR TRANSPORTATION.
APPLICATION FILED MAR. 6, 1916. RENEWED OCT. 29, 1918.
1,307,255.
Patented June 17, 1919.
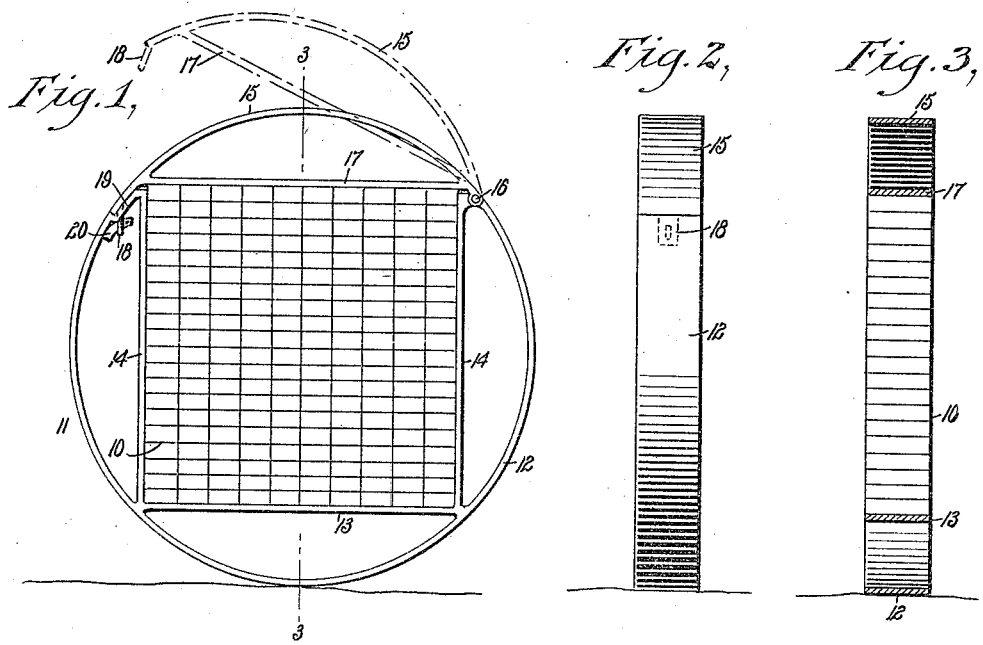
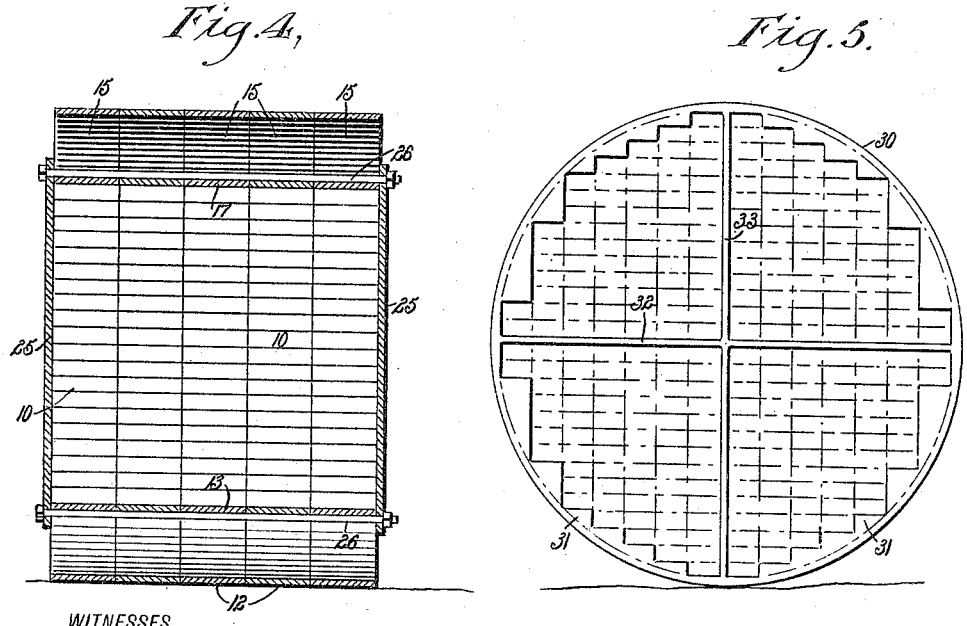
WITNESSES
Edw. Thorpe
Rev. G. Hooker
INVENTOR
William T. Hookey
BY
ATTORNEYS

UNITED STATES PATENT OFFICE.

WILLIAM T. HOOKEY, OF NEW YORK, N. Y.

PACKAGING BRICKS FOR TRANSPORTATION.

1,307,255. Specification of Letters Patent. Patented June 17, 1919.

Application filed March 6, 1916, Serial No. 82,449. Renewed October 29, 1918. Serial No. 260,175.

*To all whom it may concern:*

Be it known that I, WILLIAM T. HOOKEY, a citizen of the United States, and a resident of the city of New York, borough of Manhattan, in the county and State of New York, have invented new and useful Improvements in Packaging Bricks for Transportation, of which the following is a full, clear, and exact description.

The object of the invention is to provide certain new and useful improvements in packaging bricks for transportation, storage or other purposes, and whereby the repeated handling of the single bricks from the time they leave a brickyard until used by the bricklayer on a building or other structure is entirely dispensed with and the cost of labor in handling is reduced to a minimum, while the bricks are not liable to be injured during the loading and unloading or while in transit.

In order to produce the desired result, use is made of a circular carrier having interior means for supporting a predetermined number of bricks in closely packed relation one to the other, to hold the bricks against shifting or displacement while the carrier is rolled along.

A practical embodiment of the invention is represented in the accompanying drawings forming a part of this specification, in which similar characters of reference indicate corresponding parts in all the views.

Figure 1 is a side elevation of the carrier filled with a predetermined number of bricks;

Fig. 2 is an edge view of the same;

Fig. 3 is a cross section of the same on the line 3—3 of Fig. 1;

Fig. 4 is a cross section of a number of carriers fastened together to form a rolling package; and Fig. 5 is a side elevation of a modified form of the carrier.

In the handling and transportation of bricks from the brickyard to a building or other structure, it has been customary heretofore to promiscuously load the bricks in a brickyard onto a wheelbarrow, cart the same to and dump the same onto a vessel, car or other transportation means. The bricks were next carried by the transporting medium to a dock or railroad yard and then unloaded onto a cart to be carried say to a building or other structure to be erected, and at this place the bricks were unloaded and re-loaded onto hods to be eventually carried to the bricklayer at work at the building. It is often the case also that the bricks on arriving at the dock or railroad yard are loaded into carts and carried to the place of business of a dealer in building materials, to be there unloaded and, as required, re-loaded onto carts and carried to a building or other structure. It will be noticed that by this mode of handling bricks a large amount of hard labor is required as the bricks have to be singly picked up not once but repeatedly and thrown about before finally reaching the bricklayer. It will also be noticed that by this repeated handling of the bricks the latter are liable to be injured before reaching the bricklayer. In order to overcome the above difficulties and to reduce the cost of labor in handling the bricks from the brickyard to the bricklayer to a minimum, the following arrangement is made:

A predetermined number of bricks 10 are piled in closely packed relation into a carrier 11 having a rim 12 of circular shape and of a width corresponding approximately to the length of a brick. Within this rim 12 and secured thereto is a bottom 13 and sides 14 for receiving the pile of bricks 10 so that the bricks are practically confined within the rim 12. A portion 15 of the rim 12 is pivotally connected or hinged at 16 to the remaining main portion of the rim carrying the bottom 13 and the sides 14, and this rim section 15 is provided with a top plate 17 overlying the top of the pile of bricks 10 so as to securely hold the bricks in position in the carrier. The free end of the hinged section 15 of the rim 12 is provided with an apertured lug 18 extending through a keeper 19 forming a set-off portion of the rim 12, and the lug 18 is engaged by a pin or other locking device 20 to securely lock the rim section in position on the rim 12, as will be readily understood by reference to Fig. 1.

In using this carrier, the bricks 10 are piled, in the brickyard, into the carrier at the time the section 15 is in open position so that the bricks rest on the bottom 13 and abut against the sides 14. When the desired number of bricks have been placed in position, the section 15 of the rim is swung down so that the plate 17 engages the top of the pile of bricks and the lug 18 engages the keeper 19. The pin 20 is then inserted to lock the rim section 15 in place. It will be noticed that the carrier containing this pile of bricks can be readily rolled along through the brickyard onto a vessel, car or other transporting medium, and carried by the latter to a railroad yard or a dock, at which the carrier can be readily rolled down a gangplank into a wagon to be carried to the building where a hoisting device can take hold of the entire carrier and take the same to the place at which the bricklayer is at work, or near the same, to be then rolled along a scaffold, if necessary, to the bricklayer, if at work at a point distant from the elevator. At the destination, the section 15 can be readily unlocked and swung open to allow the bricklayer remove the bricks from the carrier as needed, or, if desired, the bricks can be dumped onto the scaffold adjacent the bricklayer. The empty carrier can be returned to the brickyard to be reloaded and to be used over again, as above explained.

As shown in Fig. 1, the carrier contains two hundred bricks, but as the bricks are sold and delivered at the rate of a thousand bricks, five such carriers filled with bricks are preferably fastened together, as plainly indicated in Fig. 4, to make a single rolling package of five individual carriers. In order to fasten the five carriers together use is made of end plates 25 connected with each other by bolts 26 extending outside of the bottom 13, the sides 14 and the plate 17 so as not to interfere with the bricks carried by the carrier. It will be noticed that the adjacent edges of the rims 12 abut and are held fastened together until the place of destination is reached when the bolts 26 and plates 25 are removed to allow of separating the individual carriers for the removal of bricks from each carrier, as above explained.

In the modified form shown in Fig. 5, the circular rim 30 is provided at its inner face with steps 31, each of a length corresponding to the width of a brick, sundry of the steps 31 being of a height corresponding to the height of a single brick, while others of the said steps 31 correspond to a multiple of the height of a brick to allow of setting the bricks into the carrier in the form of a pile of bricks having a predetermined number of bricks and the bricks packed in close relation one to the other. If desired, the rim 30 may be reinforced by division plates 32 and 33 arranged in the form of a cross and having their ends connected with the rim 30, the division plate 32 extending horizontally and the division plate 33 extending vertically at the time of loading the bricks into the carrier. The steps 31 may form integral parts of the rim 30 or may be loosely fitted to the interior surface thereof, as indicated in dotted lines in Fig. 5.

I do not limit myself to the particular supporting means shown and described for the bricks within the rim, as the same may be varied without deviating from the spirit of my invention, it being, however, understood that in each case a rolling package is provided in which the bricks are firmly packed.

Having thus described my invention, I claim as new and desire to secure by Letters Patent:

1. In a package for the transportation of bricks, a carrier having a circular rim open at both ends and adapted for rolling, the width of the rim corresponding to the length of a brick, and interior means connected with the rim for supporting a predetermined number of bricks in closely packed relation one to the other, to hold the bricks against displacement while rolling the carrier along.

2. A rolling package for the transportation of bricks, comprising a carrier having a circular rim open at both ends and of a width corresponding approximately to the length of a brick, and supporting means arranged within the rim and connected thereto, the supporting means being of a width corresponding to the width of the rim, for supporting within the same a predetermined number of bricks in closely packed relation, the ends of the bricks lying within the planes of the faces of the said carrier.

3. In a package for the transportation of bricks, a circular rim made in a body section and a cover section, the sections being hinged together, the body section being provided interiorly with a bottom and sides for sustaining a pile of bricks of a predetermined number and packed in close relation one to the other, the said cover section having a top extending over the top of the pile of bricks, and means for locking the cover section in place on the body section to securely lock the pile of bricks in place.

4. In a package for the transportation of bricks, a circular rim made in a body section and a cover section, the sections being hinged together, the body section being provided interiorly with a bottom and sides for sustaining a pile of bricks of a predetermined number and packed in close relation one to the other, the said cover section having a top extending over the top of the pile of bricks, the free end of the said cover section being provided with an apertured locking lug and the said body section being provided with a keeper adapted to be engaged by the said lug, and locking means engaging the lug to lock the same in place in the keeper, the said lug, keeper and locking means being located interiorly of the said rim.

5. In a package for the transportation of bricks, a number of circular carriers having rims of like diameters and each adapted to receive a predetermined number of bricks piled in close relation to each other, the edges of the rims abutting one against the other and each rim being approximately of a width corresponding to the length of a brick to confine the bricks within each rim, and means for temporarily fastening the carriers together to provide a single rolling package.

6. In a package for the transportation of bricks, a number of circular carriers having rims of like diameters and each adapted to receive a predetermined number of bricks piled in close relation to each other, the edges of the rims abutting one against the other and each being approximately of a width corresponding to the length of a brick to confine the bricks within each rim, each rim being provided with brick-holding means confined wholly within the opening of the rim, bolts extending transversely intermediate the rim and the said holding means, and plates at the outer faces of the outermost carriers and engaged by the said bolts to fasten the carriers together and thereby provide a single rolling package.

In testimony whereof I have signed my name to this specification in the presence of two subscribing witnesses.

WILLIAM T. HOOKEY.

Witnesses:
 THEO. G. HOSTER,
 PHILIP D. ROLLHAUS.

Copies of this patent may be obtained for five cents each, by addressing the "Commissioner of Patents, Washington, D. C."